Sept. 1, 1953 R. E. LONG 2,650,628
TREE FELLING AND LAND-CLEARING ATTACHMENT
Filed Aug. 14, 1952 2 Sheets-Sheet 1
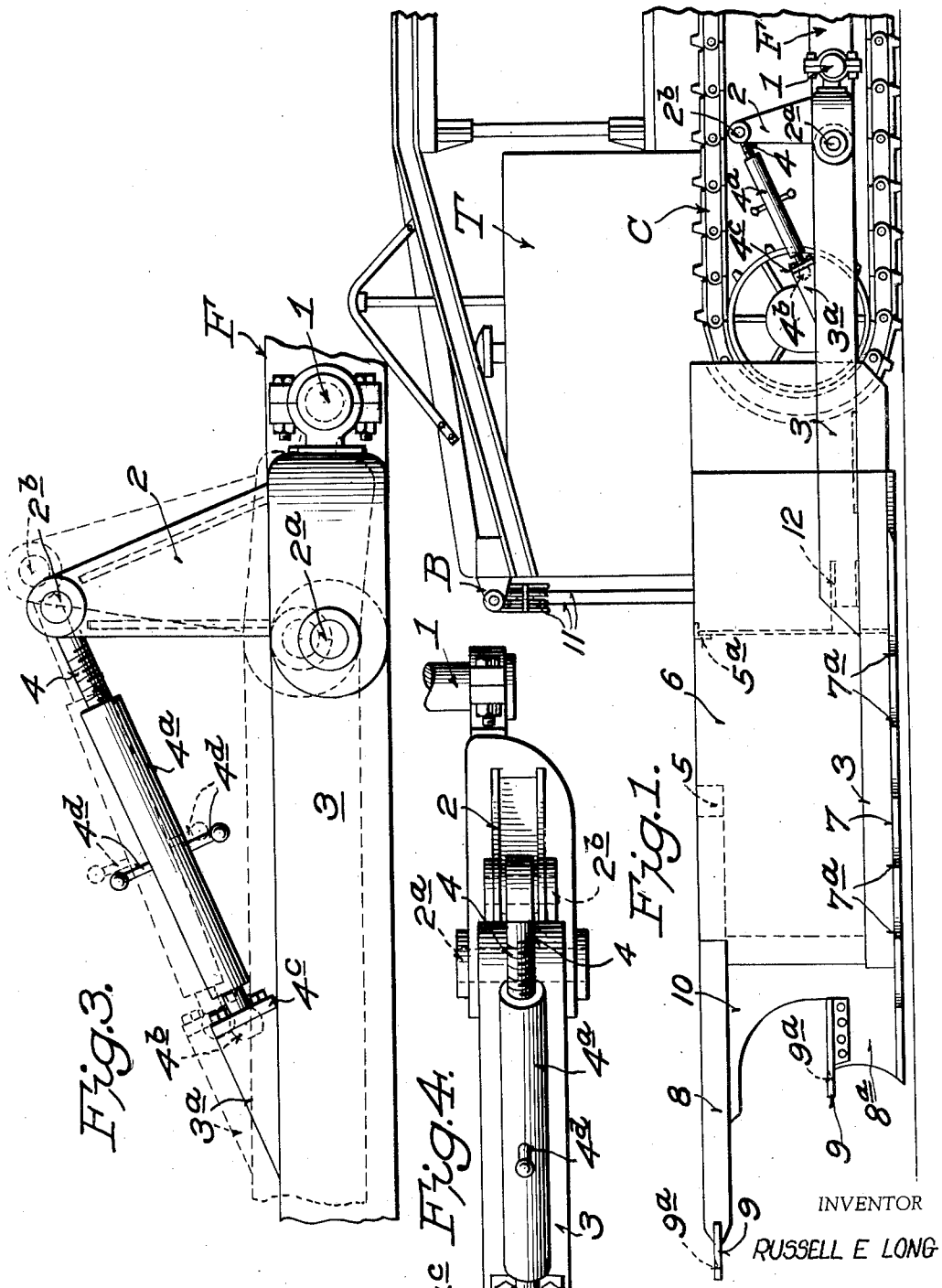
INVENTOR
RUSSELL E. LONG
BY
ATTORNEYS

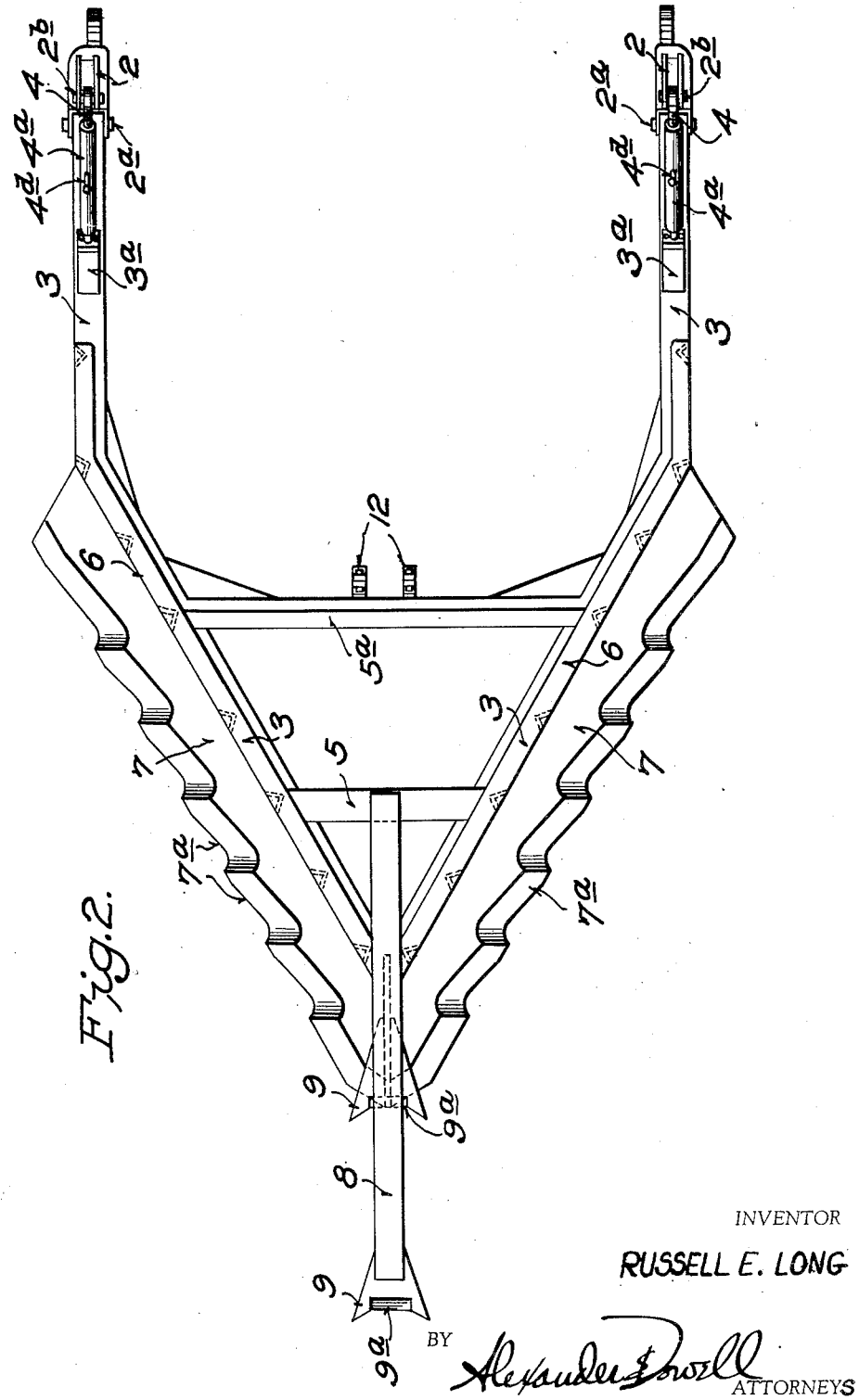

Patented Sept. 1, 1953

2,650,628

UNITED STATES PATENT OFFICE 2,650,628

TREE FELLING AND LAND-CLEARING ATTACHMENT

Russell E. Long, Gray Ridge, Mo.

Application August 14, 1952, Serial No. 304,323

9 Claims. (Cl. 144—34)

My invention is a novel land-clearing blade which serves as an attachment for tractors, bulldozers or the like, and is primarily intended to clear foliage, vegetation and trees from land prior to cultivation thereof.

The principal object of my invention is to furnish a clearing attachment which travels over the land at surface level and severs the trees or other growths at ground level; or which, in the case of larger trees, may be used to sever the roots thereof near ground level so that the trees may be relatively easily pushed over.

Another very important object of my invention is to provide a V-shaped land-clearing attachment of the character specified, said attachment having pusher booms extending outwardly from its prow and adapted to contact a tree at a point fairly high up on the trunk so as to provide sufficient leverage to push the tree over after the roots thereof have been severed.

Another object of my invention is to provide each of the aforementioned pusher booms with a bifurcated outer end, the bifurcated portion lying in a horizontal plane and serving to contact the trunk of a tree and prevent the pusher boom from deflecting or sliding sideways off of the trunk. The prow of the attachment may be provided with two booms, one above the other, the upper boom extending outwardly well beyond the lower boom, and the combination of the two booms serving to provide efficient bending means particularly useful in removing relatively small supple tree trunks which might, in the absence of the lower boom, be bent all the way over to the ground by the upper boom and cause the attachment to ride up on the bent trunk. In this application the upper boom pushes the tree over as far as it can and then the lower boom engages the lower end of the bent tree trunk so low to the ground that the tree is either torn out of the ground or is bent over so far that the knife blades around the lower periphery of the attachment can cut off the tree thus permitting the attachment to push it to one side.

Still another important object of my invention is to provide a V-shaped land-clearing blade having substantially horizontally-disposed toothed blades along the lower periphery of the V-shaped attachment, said blades serving to cut the growths on the land at ground level, or, in the case of relatively large trees, said blades serving to cut the roots of the trees near ground level. I provide wavy teeth along the outer edges of the blades, which teeth are so shaped that when they are being used to cut relatively thick trees, the teeth will engage the tree with a stepping motion, which intermediate engagement permits the tractor or other prime mover to gain momentum as the blade moves along from tooth to tooth.

Still another object of my invention is to provide a land-clearing blade which is V-shaped when viewed from above so that when the blade is engaged with a relatively solid tree, the tractor will not be stalled but will be deflected sideways so as to provide a sawlike cutting motion between the blade and the tree, the aft end of each blade extending outwardly somewhat beyond the greatest width dimension of the tractor and attachment so that the tractor will be deflected entirely clear of the tree trunk and will be free to turn and make another pass at the tree without danger of the tree trunk snagging against the side of the tractor or attachment and causing stalling or damage.

The V-shaped attachment has two supporting arms extending rearwardly therefrom, the aft ends of said arms being journaled on the frame of the tractor. The forward or pusher-boom end of the attachment is raised and lowered by any suitable means, such as a power-operated block-and-tackle located on the front of the tractor and attached to a cross-member between the V-shaped blades of the attachment. As stated above, this attachment is primarily intended to be operated at ground level and, since the level at which the tractor operates with respect to the surface of the ground will depend on the softness of the earth and the depth to which the tractor sinks therein, it is desirable to provide a convenient means for raising and lowering the aft ends of the supporting arms with respect to the frame of the tractor. It is, therefore, a very important object of my invention to provide means for readily adjusting the height of the aft ends of the supporting arms so that the blade may be operated level along its entire length with respect to the surface of the ground.

Further objects and advantages of my invention will become apparent during the following discussion of the drawings, wherein:

Figure 1 is a side elevation showing my novel attachment secured to a caterpillar-type tractor.

Fig. 2 is a plan view of my novel attachment.

Fig. 3 is an enlarged view of the toggle adjustment means whereby the height of the aft ends of the supporting arms may be adjusted with respect to the frame of the structure, Fig. 3 also showing in dotted lines a different position of the adjustable toggle means.

Fig. 4 is an enlarged plan view of said toggle adjustment means.

Referring now to the drawings, Fig. 1 shows a tractor T having a lower frame F supporting the crawler tracks C on which the tractor runs. Extending outwardly on each side of the frame F is a stub shaft 1 rotatably supporting a toggle arm 2. At the lower end of the toggle arm 2 is a pivot 2a to which a supporting arm 3 is rotatably mounted. The pivot arm 3 carries a boss 3a located somewhat forward of the pivot 2a, said boss serving the purpose hereinafter explained.

At the upper end of the toggle arm 2 is a second pivot 2b to which is rotatably attached a threaded stud 4. Associated with the stud 4 is a sleeve 4a, said sleeve having an internally tapped bore the threads of which engage the threads of the stud 4. At the forward end of the sleeve 4a is an outwardly extending knuckle 4b which is universally mounted and secured in a recess in the boss 3a by a plate 4c bolted to the boss. The sleeve is provided with a transversely extending handle 4d which assists the operator in rotating the sleeve to change the spread between the boss 3a and the upper pivot 2b.

By reference to Fig. 3 it will be seen that the aft end of the supporting arm 3 can be raised and lowered with respect to the frame F by rotating the sleeve 4a and moving the upper pivot 2b of the toggle arm 2 back or forth to raise or lower the pivot 2a.

While Figs. 1 and 3 illustrate only the left side of the toggle adjustment means, it is to be understood that similar means are provided on the right side of the tractor, which means in Fig. 2 have been designated by the same reference characters to indicate similar parts.

By reference to Fig. 2 it will be seen that the supporting arms 3 extend forwardly in mutually parallel relation as far as the front end of the tractor and that the arms 3 then converge into an apex near the prow of the attachment. Several spacers such as 5 and 5a are provided to lend rigidity to the frame, which may be of welded construction.

The V-shaped frame is externally covered by vertically disposed plow-like members 6 which serve to shove the debris outwardly away from the sides of the tractor as the cutting blades 7 sever the growths at the surface of the land. The blades 7 are provided with sharp serrated edges 7a, which edges resemble the teeth of a saw. The serrations along the edges of the blades provide relatively small areas of contact between the blade edges and the tree being cut. The advantages of the tooth-like structure of the blades are: first, that the length of contact between the edge of the blade and the tree being cut is reduced so as to increase unit cutting pressures; and second, that resistance to forward motion varies in a step by step fashion as the blade progresses from tooth to tooth against the tree so that the tractor is able to gather momentum during the increment of travel between the outstanding teeth.

At the prow of the attachment I have provided upper and lower pusher booms, the upper pusher boom 8 being rigidly mounted at the upper leading end of the attachment and being of extremely sturdy construction. Likewise, the lower pusher boom 8a is rigidly installed at the lower leading end of the attachment, and the boom 8a is considerably shorter than the boom 8 for the reason hereinafter stated.

The forward end of each of the pusher booms is provided with a bifurcated tip member 9 having a sharpened central portion 9a adapted to dig into the tree trunk and prevent relative slippage between the pusher tip 9 and the trunk of the tree. A metal web 10 may be inserted between the two boom arms to increase the rigidity therebetween.

In order to adjust and maintain the desired height for the leading end of the attachment, lifting means is provided on the front end of the tractor, said means, Fig. 1, including a conventional block and tackle assembly 11 engaging a bracket B on the front of the tractor and engaging a pair of brackets 12 centrally located within the frame 3 of the attachment, said block and tackle being power driven by any well-known means.

Operation

In operating my novel land-clearing attachment, the driver of the tractor raises the front end of the attachment by shortening up on the block-and-tackle 11 and drives the tractor out into the field to be cleared. When the tractor has entered the field the depth to which the crawler members C will sink into the earth can be determined. Having thus determined this depth, the driver rotates the sleeves 4a so as to set the toggle arms 2 into a position in which the arms 3 of the land-clearing attachment will be level with the surface of the land when the forward end of the attachment is lowered into engagement therewith.

Having thus adjusted the level of both ends of the land-clearing attachment, the driver then proceeds to run the tractor forwardly, thereby bringing the blades 7 into engagement with whatever growths appear on the surface of the land, the blades 7 severing the growths and the plows 6 pushing the debris to one side so as to leave a clear path for the tractor.

When a suitable size land-clearing attachment is used on a heavy-duty crawler-type tractor, the device will be able to easily cut down all of the small trees and other growths appearing on the surface of the land. If, however, a larger tree is encountered, the driver must run the tractor in a circle therearound with the teeth 7a in engagement with the tree at the upper ends of the roots. After having circled the tree one or more times, the teeth 7a will have severed the roots thereof, and the tree may then be pushed over by means of the pusher booms 8. If the tree is fairly sizable, it may be necessary to raise the front end of the attachment by taking up on the block and tackle 11 so that the pusher member 9 engages the trunk of the tree relatively high up thereon, thereby providing sufficient leverage to push the tree over.

The lower pusher boom 8a and associated tip member 9 serves to assist in the removal of relatively smaller trees having supple trunks. In the absence of the lower pusher boom 8a, a small tree of this type might merely cause the attachment to ride up over its bent trunk without cutting the trunk through, but the presence of the lower pusher boom 8a prevents such riding up of the forward end of the attachment by contacting the trunk of the tree so near the ground that the tree cannot bend sharply enough to escape the lower tip member 9. The result then is that the lower pusher boom engages the tree and tears the latter up by the roots, the sharpened surfaces 9a of the tip members 9 tending to cut into the tree trunk and prevent sliding of the pusher in a direction axial with respect to the trunk of the tree.

By use of this attachment I have been able to clear several acres of wooded area per hour, the land-clearing attachment leaving the earth sufficiently clean to permit cultivation thereof as soon as the debris has been removed from the surface I do not limit my invention to the exact form shown in the drawings, for obviously changes may be made therein within the scope of the claims.

I claim:

1. A land-clearing attachment for use on a tractor comprising, a substantially horizontally disposed frame having a V-shaped portion terminating in a forwardly facing apex, said frame having rearwardly extending supporting arms rigidly fixed thereto and pivotally mounted at their aft ends to the tractor; a V-shaped scraper blade fixed to said V-shaped portion; means on the tractor for raising and lowering said frame about said pivotal mounts; toothed cutting members extending laterally outwardly around the lower periphery of said blade; and a relatively long and narrow pusher boom fixed to the apex of said frame above said cutting members and extending forwardly therebeyond.

2. In an attachment as set forth in claim 1, a second pusher boom fixed to and extending forwardly from said frame apex and spaced between said first mentioned boom and said cutting members, said second boom being shorter than said first mentioned boom and disposed parallel therewith.

3. In the combination set forth in claim 1, said pivotal mounts comprising adjustable pivotal means associated with said tractor and said supporting arms for adjusting the height of the aft ends of said arms with respect to the land, said adjustable pivot means and said raising and lowering means serving to maintain the plane of said cutting members substantially level with the land.

4. A land-clearing attachment for use on a tractor comprising, a substantially horizontal V-shaped blade with its apex forward, said blade being supported on a frame having rigid rearwardly extending supporting arms pivotally mounted at their aft ends to said tractor; toothed cutting members extending laterally outwardly around the lower periphery of the blade; spaced upper and lower relatively long and narrow pusher booms fixed to and extending forwardly from the apex of the blade beyond said cutting members, the upper boom being longer than the lower boom; and raising and lowering means for adjusting the height of the blade with respect to the land.

5. In an attachment as set forth in claim 4, the forward ends of each of said pusher booms having a bifurcated tip with sharpened forward inner edges.

6. In the combination set forth in claim 4, the pivotal mounting at the aft ends of said arms being adjustable to alter the height of said aft ends with respect to the land, said adjustable pivot mounts and said raising and lowering means serving to maintain the plane of said cutting members substantially level with the land.

7. A land-clearing attachment for use on a tractor comprising, a substantially horizontally disposed frame having a V-shaped portion terminating in a forwardly facing apex, said frame having rearwardly extending supporting arms rigidly fixed thereto and pivotally mounted at their aft ends to the tractor; a V-shaped blade fixed to said V-shaped portion and having substantially vertically disposed scraper surfaces; means on the tractor for raising and lowering said frame about said pivotal mounts; toothed cutting members extending outwardly around the lower periphery of said blade; spaced upper and lower relatively long and narrow pusher booms fixed to and extending forwardly from the apex of the frame above said cutting members, the upper boom being longer than the lower boom; and means for adjusting the height of the aft ends of said arms.

8. An attachment for use on a tractor, comprising a substantially horizontal V-shaped frame with its apex forward and having supporting arms rigid therewith and pivotally mounted at their aft ends to the tractor; means on the tractor for raising and lowering the forward end of the frame; toothed cutting members extending laterally outwardly around the lower periphery of the frame; a relatively long and narrow pusher boom fixed to and extending forwardly from the upper part of the apex of the frame, the boom being spaced above said cutting members and extending forwardly beyond the apex thereof; and means for adjusting the height of the aft ends of said arms.

9. In an attachment as set forth in claim 8, a second pusher boom fixed to said frame apex and spaced between said first mentioned boom and the apex of said cutting members, said second boom being shorter than said first mentioned boom and extending forwardly in parallel relation thereto.

RUSSELL E. LONG.

References Cited in the file of this patent

UNITED STATES PATENTS

| Number | Name | Date |
| --- | --- | --- |
| 956,768 | Jauer | May 3, 1910 |
| 1,414,319 | Zaiauskis | Apr. 25, 1922 |
| 1,710,749 | Svendsgaard | Apr. 30, 1929 |
| 1,830,871 | Domagala | Nov. 10, 1931 |
| 1,894,516 | Karstedt | Jan. 17, 1933 |
| 2,173,406 | Wilkinson | Sept. 19, 1939 |
| 2,191,048 | Tims | Feb. 20, 1940 |
| 2,365,408 | Hillyer | Dec. 19, 1944 |
| 2,396,407 | Austin | Mar. 12, 1946 |
| 2,462,314 | Fuqua | Feb. 22, 1949 |
| 2,542,952 | White | Feb. 20, 1951 |
| 2,584,485 | McNeel | Feb. 5, 1952 |
| 2,633,164 | Kissner et al. | Mar. 31, 1953 |
| 2,633,880 | Mattson | Apr. 7, 1953 |

FOREIGN PATENTS

| Number | Country | Date |
| --- | --- | --- |
| 20,705 | Great Britain | 1890 |

OTHER REFERENCES

Engineering News-Record, June 21, 1951.